(12) United States Patent
Perry et al.

(10) Patent No.: US 8,191,387 B2
(45) Date of Patent: Jun. 5, 2012

(54) SYSTEM AND METHOD FOR CONTROLLING TEMPERATURE IN A FOREHEARTH

(75) Inventors: Philip D. Perry, Perrysburg, OH (US);
Dale A. Gaerke, Perrysburg, OH (US);
C. Oscar Sung, Sylvania, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 447 days.

(21) Appl. No.: 12/434,354

(22) Filed: May 1, 2009

(65) Prior Publication Data
US 2010/0275653 A1 Nov. 4, 2010

(51) Int. Cl.
*C03B 9/41* (2006.01)
(52) U.S. Cl. .......... 65/158; 65/29.19; 65/29.21
(58) Field of Classification Search .......... 65/29.19, 65/29.21, 158
See application file for complete search history.

(56) References Cited

U.S. PATENT DOCUMENTS

| | | |
|---|---|---|
| 3,416,908 A | 12/1968 | Goodwin et al. |
| 3,420,510 A | 1/1969 | Griem, Jr. |
| 3,424,378 A | 1/1969 | Martin |
| 3,860,407 A | 1/1975 | Fertik |
| 3,915,682 A | 10/1975 | Chotin et al. |
| 3,953,188 A | 4/1976 | Fertik |
| 3,954,433 A | 5/1976 | Holler |
| 4,028,083 A | 6/1977 | Patznick et al. |
| 4,368,034 A | 1/1983 | Wakamiya |
| 4,375,369 A | 3/1983 | Border et al. |
| 4,622,059 A | 11/1986 | Brown |
| 4,654,066 A | 3/1987 | Garcia et al. |
| 4,812,156 A | 3/1989 | Virey et al. |
| 5,106,294 A | 4/1992 | Profos |
| 5,358,541 A | 10/1994 | Kindall |
| 5,693,110 A | 12/1997 | Iwaihara et al. |
| 6,454,562 B1 | 9/2002 | Joshi et al. |
| 6,796,147 B2 | 9/2004 | Borysowicz et al. |
| 7,020,540 B2 | 3/2006 | Linehan et al. |
| 7,371,996 B2 | 5/2008 | Kunisch et al. |
| 2004/0214118 A1 | 10/2004 | Sullivan |
| 2008/0057451 A1 | 3/2008 | Fujiwara |
| 2009/0111065 A1 | 4/2009 | Tompkins |

FOREIGN PATENT DOCUMENTS
EP 0 488 969 A2 6/1992

OTHER PUBLICATIONS

PCT International Preliminary Report on Patentability, International Application No. PCT/US10/31855, International Filing Date-Apr. 21, 2010, Date of Mailing-Sep. 27, 2011, 8 pages.
Wang, Q., Chalaye, G., Thomas, G. and Gilles, G., Predictive Control of a Process, Control Eng. Practice, vol. 5, No. 2, 1997, pp. 167-173.

*Primary Examiner* — Matthew Daniels
*Assistant Examiner* — Russell Kemmerle, III

(57) ABSTRACT

Systems and methods are provided for controlling temperature in a glass forehearth. In one implementation, a system includes at least one burner disposed in said forehearth, a manifold coupled to said burner, a combustion fuel supply coupled to said burner, a combustion air blower for delivering ambient air under pressure to said manifold, and a controller coupled to said burner for controlling operation of said burner. The system may include a temperature sensor operatively coupled downstream of the blower for providing to the controller a temperature signal indicative of temperature of air delivered to the manifold by the blower. The controller may be responsive to the temperature signal for controlling operation of the burner as a function of current temperature of air fed to the manifold. Operation of the burner may also be controlled as a function of an average air temperature over a preceding time duration.

11 Claims, 3 Drawing Sheets

Time

US 8,191,387 B2

SYSTEM AND METHOD FOR CONTROLLING TEMPERATURE IN A FOREHEARTH

The present disclosure relates generally to glassware forming and more particularly to systems and method for controlling temperature in a forehearth.

BACKGROUND AND SUMMARY OF THE DISCLOSURE

In glassware manufacture, it is known to provide a glass forehearth the temperature of which is maintained by one or more combustion burners. Operation of the burners may be controlled as a function of feedback obtained from thermocouples disposed in contact with the molten glass in the sidewall channels of one or more zones of the forehearth. Accordingly, detected changes in the temperature of the glass as sensed by the in-glass thermocouples may be used to vary the output of the burners as desired to achieve a desired glass temperature in a given zone of the forehearth. While this may be a generally accurate way to adjust forehearth zone temperatures, the in-glass thermocouples are expensive and require higher capital investments for a given forehearth.

The present disclosure embodies a number of aspects that can be implemented separately from or in combination with each other.

In one implementation, a system is provided for controlling temperature in a forehearth that includes at least one burner disposed in the forehearth for heating glass in the forehearth, a manifold coupled to the burner, a combustion fuel supply coupled to the burner, a combustion air blower for delivering ambient air under pressure to the manifold, and a controller coupled to the burner for controlling operation of the burner. The system may include a temperature sensor operatively coupled downstream of the blower for providing to the controller a signal indicative of temperature of air delivered to the manifold by the blower. The controller may be responsive to this temperature signal for controlling operation of the burner as a function of current temperature of air fed to the manifold. The controller may also control operation of the burner as a function of an average air temperature over a preceding time duration. In one form, the average air temperature is a moving average air temperature over a predetermined time period.

According to at least one implementation, a method is provided for controlling glass temperature in a forehearth that includes at least one burner associated with the forehearth for heating glass in the forehearth, a manifold coupled to the burner, a combustion fuel supply coupled to the burner, and a combustion air blower for delivering ambient air under pressure to the manifold. The method may include providing to the controller a signal indicative of the combustion air pressure provided to the burner, providing to the controller a signal indicative of the temperature of air downstream of the blower, and controlling the output of the burner as a function of these pressure and temperature signals. In at least one form, the mass flow rate of a combustible air/fuel mixture is maintained constant over varying combustion air temperatures to at least reduce the effect of, for example, changing ambient air temperature.

According to at least one implementation a method is provided for controlling glass temperature in a forehearth that includes at least one burner associated with the forehearth for heating glass in the forehearth, a manifold coupled to the burner, a combustion fuel supply coupled to the burner, a combustion air blower for delivering air under pressure to the manifold, and a cooling air supply communicated with the manifold. The method may include generating a nominal burner pressure curve as a function of the amount of cooling air provided to the manifold wherein the pressure curve includes a first portion in which the temperature downstream of the burner over a first range of desired temperature conditions is controlled at least primarily by adjusting the amount of cooling air provided to the system and the pressure curve includes a second portion in which the temperature downstream of the burner over a second range of desired temperature conditions different from the first range is controlled at least primarily by adjusting the burner pressure. The method may also include controlling the burner pressure as a function of the nominal burner pressure curve. In one form, the burner pressure is controlled as a function of the current air temperature downstream of the blower and also may be controlled as a function of an average air temperature downstream of the blower over a preceding time period.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
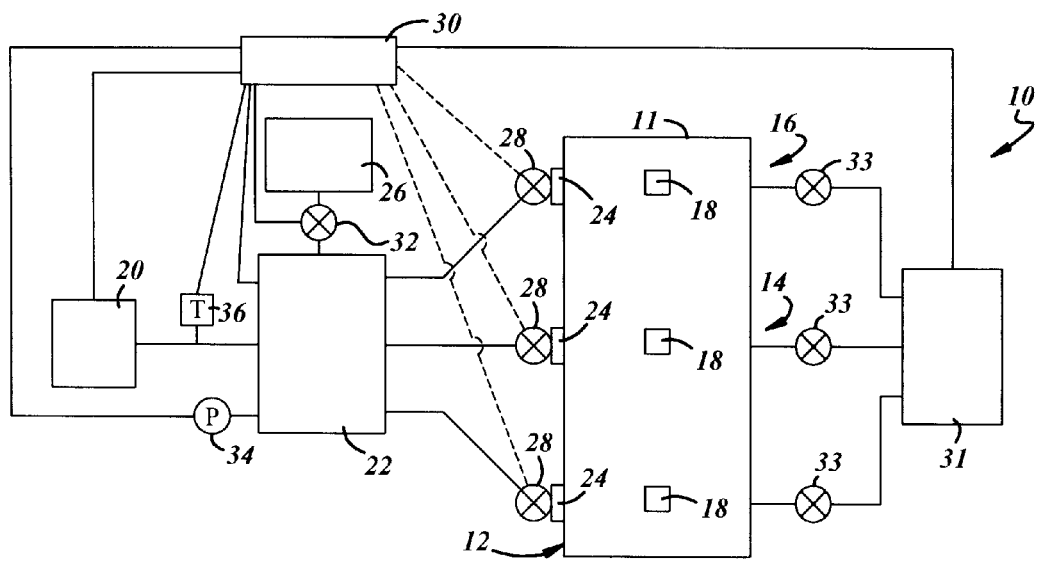
FIG. 1 is a diagrammatic view of a portion of a glass forming system including a forehearth.

Referring in more detail to the drawings, FIG. 1 illustrates a portion of a glassware forming system 10 including a glass forehearth 11 through which molten glass flows during the production of glassware. The forehearth 11 may include back, middle and front zones 12, 14, 16 each of which may include one or more thermocouples 18 for feedback control of, for example, the temperature within the various zones 12, 14, 16. A fan or combustion air blower 20 provides a forced current of ambient air under pressure to a main header or manifold 22 that routes the air to the various zones 12, 14, 16 which each may include, receive therein, or otherwise be associated with, one or more combustion burners 24. The manifold 22 distributes to the combustion burners 24 a combustible mixture of fuel from a fuel supply 26 and air from the combustion blower 20. The flow rate through a given combustion burner 24 may be controlled by a valve 28, the position or open extent of which may be set and controlled by a suitable controller 30. The controller 30 may also control the operation of the blower 20, flow rate from the fuel supply 26 to the manifold (such as via a valve 32), the flow rate of a cooling air supply 31 to the forehearth zones 12, 14, 16 (such as by controlling one or more supply valves 33) and many other functions within the glassware forming system 10. Of course, multiple controllers could be provided with each handling certain tasks, as desired, and the fuel supply 26 may be coupled to the burners either through the manifold 22, or downstream of the manifold 22.

In use, as the temperature of air fed to the combustion burners 24 changes, so does the density of the air flowing through the combustion burners 24. Accordingly, the mass flow rate of gas and air that flows through the combustion burners 24 can vary for a given position of its valve 28 as the air temperature varies. In this manner, the output of a combustion burner 24 can vary over a given set point of its control valve (i.e. a given position of the valve), and hence, the temperature within the forehearth zones can likewise change.

Also, the output pressure of the combustion blower 20 varies as a function of the volume of air the system draws from the blower and by the ambient temperature of the air supplied to the blower 20. In a system with automatic temperature control, such as feedback control based on glass temperature, there will be a varying volume demand from the combustion blower 20 which creates a variation in its supply pressure. Because a single blower 20 may provide air to more than one, or even all, of the combustion zones 12, 14, 16 on a single forehearth 11, changes in the volume requirements of any single zone 12, 14, 16 within the forehearth 11 can interact and affect the supply pressure to the other zones. Further, ambient air temperature at the inlet of the blower 20 has an inverse effect on the outlet pressure of the blower 20 for a given power demand. This effect on the outlet pressure will affect all combustion zones 12, 14, 16 within the forehearth 11 concurrently and in the same general direction (that is, increasing or decreasing pressure). Accordingly, as the air temperature flowing through the blower 20 increases, the outlet supply pressure of the blower 20 decreases, and vice versa.

Further, temperature changes in the ambient air supplied to the blower 20 provide changes in the density of the air at the blower. And the blower 20 itself can heat the air with the amount of work or heat applied to the air by the blower varying as a function of the demand from the system 10. In general, higher air demands from the blower 20 mean that the air is resident at the blower for a shorter period of time and hence is heated less by the blower whereas times of low demand by the system 10 permit the air to be heated more by the blower 20. Accordingly, the ambient temperature change as well as the temperature change caused by the blower 20 can affect the output conditions of the blower 20 and the density of the air discharged from the blower to the manifold 22.

To accommodate for the changes in air conditions within the forehearth system 10, a control strategy may use feedback from one or more manifold pressure sensors 34, and a temperature sensor 36 to enable control of the combustion burners 24. The manifold pressure sensor 34 may be coupled to the manifold and operable to send a signal to the controller that is indicative of the pressure within the manifold 22. The temperature sensor 36 preferably is operatively coupled downstream of the blower 20 so that it is responsive to not only ambient air temperature changes, but also the changes in air temperature caused by the blower itself. Accordingly, the temperature feedback can be used to vary the flow rate through the combustion burner valves 28 as a function of the temperature and density changes in the air delivered to the combustion burner valves. In one implementation, the combustion burners 24 may be controlled to provide a generally constant mass flow rate of the gas and air combustion mixture to each zone 12, 14, 16 of the forehearth 11. In one exemplary implementation, operating a forehearth using the temperature compensated generally constant mass flow rate control to each forehearth combustion zone reduced ambient temperature effects by about 75 percent. In addition to or instead of controlling the open extent of the burner valves 28, the blower 20 could have a variable output that may be modified by the controller to control the flow rate through the burner valves 28 and/or combustion burners 24.

Figure 4:
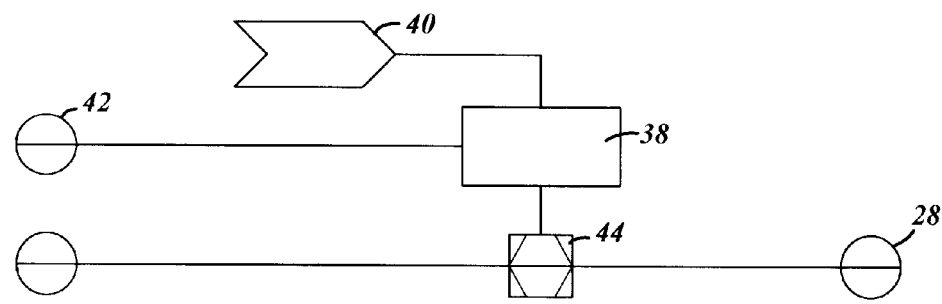
FIG. 4 is a schematic diagram of a control system for a glass forehearth including combustion burner pressure control as a function of input air temperature.

The temperature compensated mass flow rate control can be implemented by augmenting operation of the combustion burner valves 28 with a compensation factor 38 (FIGS. 4 and 5) derived as a function of the temperature feedback provided from the temperature sensor 36 (FIG. 1). In this way, the combustion burner valve set point (that is, the extent to which the valve 28 is open) is modified by the controller 30 in response to the temperature feedback data. This is shown schematically in FIG. 4 wherein a nominal combustion burner valve control value 40 and temperature data 42 from the temperature sensor 36 are inputs to the controller 30 (FIG. 1) and the controller 30 provides an output combustion burner control value 44 that may, depending on the temperature sensor data, differ from the nominal value by a temperature compensation factor 38.

In one implementation, the temperature compensation factor 38 is derived as a function of the differential pressure across the combustion burner valve 28. This assumes, more or less, that the discharge pressure of the burner 24, which is equal to the internal pressure in the forehearth 11, is very low compared to the upstream pressure in the manifold 22 leading to the combustion burner 24. Given these assumptions, the temperature corrected mass flow across the combustion burner valves 28 can be expressed as:

$$Q = K\sqrt{h * \frac{Td}{Tf}}$$

where Q equals mass flow, K is a flow calibration constant, h is the differential pressure across the combustion burners, Td is the design temperature (absolute units), and Tf is the sensed temperature (absolute units). From this, the burner pressure required for a specific mass flow is given by the equation:

$$h = (Q/K)^2 * \frac{Tf}{Td}$$

Since the mass flow rate, Q, is held to a constant value, the square of one constant divided by another constant can be expressed as a third constant, $K_2$, or:

$$h = K_2 * \frac{Tf}{Td}$$

From this, the combustion burner valve operation can be adjusted as necessary to achieve the desired combustion burner operating pressure to achieve the desired flow rate through the burner even as the air temperature varies due to ambient temperature changes or changes caused by the blower 20.

Further, so that the system 10 can make smaller incremental corrections over the day and night temperature swings that are corrected or compensated to the seasonal average temperature, the presently sensed air temperature can be compared to a moving average manifold temperature. The moving average temperature may include temperature data acquired over some recent, pre-determined time period. In this manner, the combustion burner valve set point can be varied based on ambient temperature as a function of a moving average temperature over a given period of time. If the moving average temperature is examined over too short a period of time, for example less than about 2 days, the variations of the moving average temperature may be too great. If the moving average is taken over too long of a time the temperature variations may not be great enough to provide the desired control. In one presently preferred implementation, a moving average temperature of between 5 to 15 days may be used, and one presently preferred form includes the average temperature over the immediately preceding 10 days. This may be represented by the following formula:

$$h_{TSP} = \frac{Tf}{T_{movavg}} * h_{RSP}$$

where $h_{TSP}$ equals manifold pressure "true set point" which is the corrected combustion burner pressure required to maintain constant mass flow rate; $h_{RSP}$ equals manifold pressure "requested set point" which is the combustion burner valve control data which would be used absent the temperature compensation of this formula; Tf equals flowing air temperature in the combustion manifold 22; and $T_{movavg}$ equals the moving average of manifold air temperature.

Figure 2:
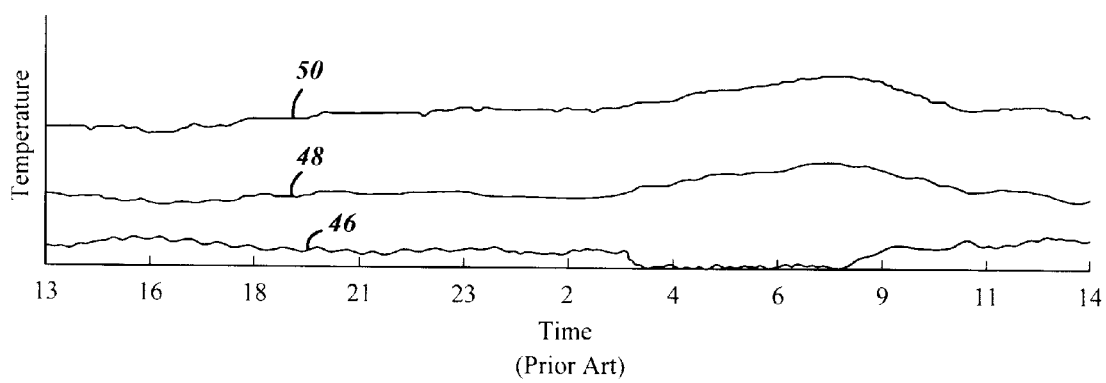
FIG. 2 is a graph of glass temperature in different forehearth zones as a function of ambient air temperature without compensation for changes in ambient air temperature.
Figure 3:
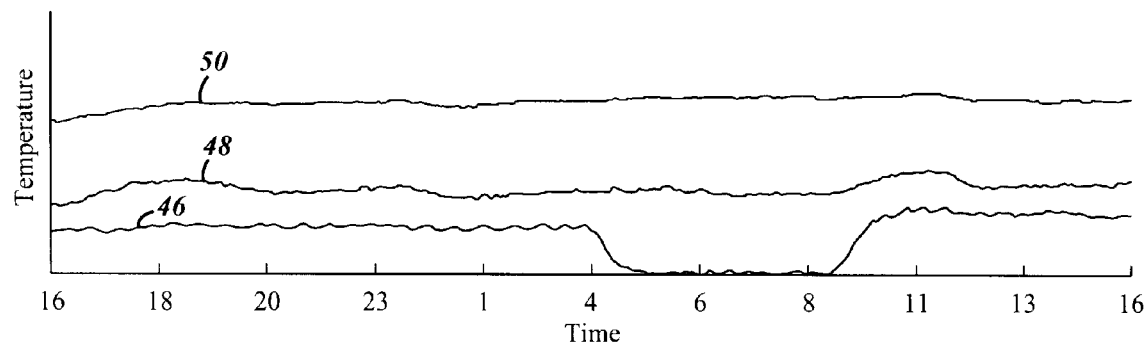
FIG. 3 is a graph of glass temperature in different forehearth zones as a function of ambient air temperature with compensation for ambient air temperature changes.

The benefit of the temperature compensated mass flow rate control of the combustion burner valves 28 can be seen by comparing FIG. 2 to FIG. 3. In these figures, ambient temperature is plotted as line 46 and glass temperatures in two sections (e.g. left and right) of a forehearth zone 12, 14, or 16 are plotted as lines 48 and 50. In these figures, an ambient temperature drop of about 20° Fahrenheit occurred between about 4 o'clock and 9 o'clock. In FIG. 2, which is a plot of empirical data from a forehearth system without ambient temperature compensation, the glass temperatures in the two forehearth sections increased significantly during that time. In contrast, the forehearth system 10 shown in FIG. 3 included ambient temperature control as set forth herein and the glass temperatures in the forehearth sections remained nearly constant despite a similar ambient air temperature change. This dramatically improved control of the glass temperatures despite significant ambient temperature change, accounts for nearly all of the recorded changes in the glass temperatures within the forehearth. Other factors contribute to relatively minor changes in glass temperature and may have other root causes.

Finally, to enable further automated control of the forehearth system 10 with ambient temperature compensations, a graph or table can be generated to control glass temperature or another temperature within or associated with the forehearth. With this graph, the combustion burners 24 are controlled based on the pressure within the manifold 22 (which is the pressure provided to the combustion burners 24), so that, for example, air density changes are accommodated. Individual pressure sensors at each burner could be provided in addition to or instead of the manifold pressure sensor 34, if desired. Nominal combustion burner pressures over a wide range of temperature conditions can be set by trial and error for any given system, with changes from that (e.g. due to ambient temperature changes) made by the control strategy implemented in the controller 30.

Figure 6:
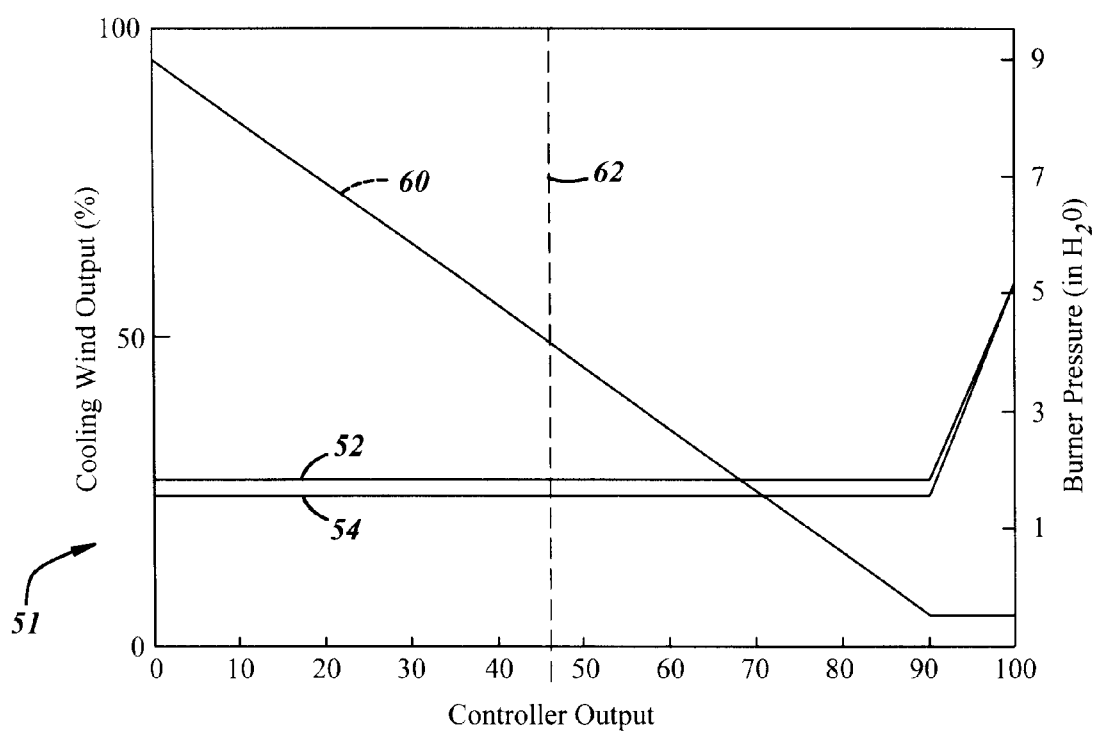
FIG. 6 is a representative heat-cool curve such as may be used in the control system of FIG. 5.

A representative temperature control graph 51 including nominal burner pressure curves 52, 54 is shown in FIG. 6. On this graph 51, the control data or curves for two combustion burners 24 are shown. In this example, the combustion burner pressures remain generally constant over a first portion of the graph, and the system temperature requirements are varied by adjusting the flow rate of cooling air input to the system, which is shown by curve 60. However, at some point reducing the cooling air flow by increasingly closing the supply valves 33 may not be sufficient to maintain or reach a desired temperature and the burner pressures must be increased to increase the combustion burner output.

In the representative graph, the transition from temperature control solely or primarily by cooling air adjustments to temperature control solely or primarily by burner pressure adjustments occurs at about 90% of controller output. At 90% of controller output the cooling air supply valve(s) is about 90% closed (or at 90% of the extent to which it can be closed by the controller). For a given operating condition, reducing the cooling air flow will increase the temperature in the corresponding portion of the forehearth for a given combustion burner output. In the representative system with which this control graph may be used, further reduction of the cooling air beyond 90% controller output valve is not sufficient to maintain or reach a desired temperature in the forehearth. Therefore, the pressure of the combustion burners is increased to increase burner output and thereby increase the temperature in the corresponding portion of the forehearth. In the example shown, the combustion burner pressure is increased from about 2.5 in $H_2O$ up to about 6 in $H_2O$ at maximum system output level, although other values and rates of change of burner pressures can be used. Also in the example shown, when the burner pressures are adjusted the cooling air is maintained at or near a constant, minimum value of about 5 to 10% of maximum closure of its control valve to the maximum system output level. In typical operation, the system 10 will require something greater than the minimum operating level (0% controller output, maximum cooling air flow) and less than the maximum operating level (100% controller output, minimum cooling air flow, maximum burner pressure). In one exemplary situation, as shown by the dashed line 62, the system is operating at about 47% of controller output at which the cooling air supply valve(s) is at about 48% open, a first combustion burner pressure (shown in line 52) is about 2.8 in $H_2O$ and the second combustion burner pressure (shown in line 54) is about 2.5 in $H_2O$.

Figure 5:
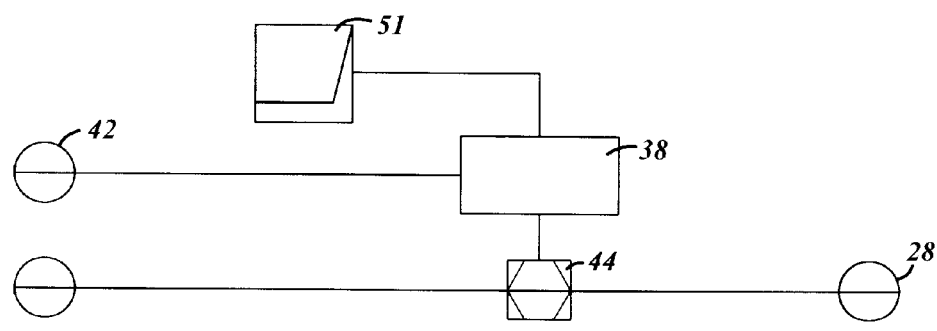
FIG. 5 is a schematic diagram of a forehearth control system including combustion burner pressure control as a function of input air temperature and based on a predetermined heat cool curve.

As shown by FIG. 5, the burner pressure curves or values taken from the graph 51 of FIG. 6 are nominal values used as an input in the control strategy providing for ambient temperature correction. In use, the burner pressure values taken from the graph of FIG. 6 (or other suitable source like a look-up table or other data collection) may be adjusted by the temperature compensation factor 38 discussed above to provide a constant mass flow rate adjusted for ambient temperature changes as a function of an average temperature over a desired time period (e.g. the 10-day moving average temperature discussed above).

The combustion burner pressure can be varied as desired over the first portion of the graph 51 (that is, when cooling air flow adjustment is solely or primarily utilized for temperature control) and need not be maintained constant as shown in the example. In at least some embodiments, the rate of change of the combustion burner pressure may be less than the rate of change of the cooling air over the first portion of the graph 51 which corresponds to a first range of forehearth operating conditions. The cooling air flow could likewise be varied in the second portion of the graph 51 (that is, when combustion burner adjustment is solely or primarily utilized for temperature control) rather than holding its valve at or near a constant position. In at least some embodiments, the rate of change of the cooling air may be less than the rate of change of the combustion burner pressure over the second portion of the graph 51 which corresponds to a second range of temperature conditions. Further, the point at which burner pressure adjustment is used to solely or primarily control temperature could be anywhere along the graph as desired, and the burner pressures may be increased while the cooling air flow still is being decreased, or before the final decrease in the cooling air flow, as desired.

The disclosure has been presented in conjunction with several exemplary embodiments, and additional modifications and variations have been discussed. Other modifications and variations readily will suggest themselves to persons of ordinary skill in the art in view of the foregoing description. For example, without limitations, the systems and methods may be utilized with different forehearth configurations, including configurations wherein a separate blower is used for each forehearth zone, the combustible fuel supply is provided downstream of the main header or manifold, and other configurations, as desired. The disclosure is intended to embrace all such modifications and variations as fall within the spirit and broad scope of the appended claims.

The invention claimed is:

1. A system for controlling temperature in a glass forehearth that includes at least one burner associated with said forehearth for heating glass in said forehearth, said system also including a manifold coupled to said burner, a combustion fuel supply coupled to said burner, a combustion air blower for delivering ambient air under pressure to said manifold, and a controller coupled to said burner for controlling operation of said burner, said system including:
    a temperature sensor operatively coupled downstream of said blower and upstream of said manifold for providing to said controller a temperature signal indicative of temperature of combustion air being delivered to said manifold by said blower,
    said controller being responsive to said temperature signal for controlling operation of said burner as a function of current temperature of combustion air fed to said manifold.

2. The system set forth in claim 1 wherein said controller is responsive to said temperature signal for controlling operation of said burner as a function of an average air temperature over a preceding time duration.

3. The system set forth in claim 2 wherein said average air temperature is a moving average air temperature.

4. The system set forth in claim 3 wherein said moving average air temperature is over a preceding time duration of at least two days.

5. The system set forth in claim 3 wherein said moving average air temperature is over a preceding time duration of between 5 and 15 days.

6. The system set forth in claim 3 wherein the current temperature is divided by said moving average air temperature to provide a temperature compensation factor.

7. The system set forth in claim 1 wherein said burner includes a valve or a variable speed blower operable to control the flow of a combustible mixture through the burner and wherein said controller is coupled to said valve or said blower to control operation of the valve and the flow rate through the burner.

8. The system set forth in claim 7 which also includes a pressure sensor coupled to said manifold and said controller to provide a signal to said controller indicative of the pressure within said manifold, and said controller is responsive to the signal from said pressure sensor to vary said valve position or blower speed as a function of the manifold pressure to provide a constant mass flow rate through said burner.

9. The system set forth in claim 1 wherein the controller is operable to maintain a constant mass flow rate through said burner.

10. The system set forth in claim 9 which also includes a cooling air supply provided to the forehearth and wherein said controller is coupled to said cooling air supply to control the flow rate of cooling air provided to said forehearth to permit control of a temperature within said forehearth while said flow rate through said burner is maintained constant.

11. The system set forth in claim 10 wherein said controller is operable to vary said cooling air flow rate over a first range of forehearth operating conditions and wherein said flow rate through said burner is increased during a second range of forehearth operating conditions.

* * * * *